United States Patent [19]

Baudouin et al.

[11] Patent Number: 5,414,253

[45] Date of Patent: May 9, 1995

[54] INTEGRATED CIRCUIT CARD

[75] Inventors: Daniel Baudouin, Missouri City; Alton Carpenter, Houston, both of Tex.

[73] Assignee: Texas Instruments Incorporated, Dallas, Tex.

[21] Appl. No.: 198,653

[22] Filed: Feb. 18, 1994

Related U.S. Application Data

[63] Continuation of Ser. No. 801,971, Dec. 3, 1991, abandoned.

[51] Int. Cl.6 .............................................. G06K 19/06
[52] U.S. Cl. ..................... 235/492; 235/441; 902/26; 361/728; 361/730
[58] Field of Search ................. 235/492, 441; 361/395, 361/392, 394, 399, 736, 728, 730, 752, 757, 737, 758, 742, 748; 902/26; 439/76

[56] References Cited

U.S. PATENT DOCUMENTS

| | | | |
|---|---|---|---|
| 4,730,232 | 3/1988 | Lindberg | 361/728 X |
| 4,780,604 | 10/1988 | Hasegawa et al. | 361/737 X |
| 4,857,005 | 8/1989 | Kikuchi et al. | 361/395 |
| 4,924,076 | 5/1990 | Kitamura | 235/492 |
| 5,017,767 | 5/1991 | Mizuno | 235/492 |
| 5,053,613 | 10/1991 | Onoda | 235/492 |
| 5,173,841 | 12/1992 | Venaka et al. | 235/492 |
| 5,319,516 | 6/1994 | Perkins | 361/730 |

FOREIGN PATENT DOCUMENTS 0407156  1/1991  European Pat. Off. ............ 361/394

*Primary Examiner*—Donald Hajec
*Assistant Examiner*—Esther H. Chin
*Attorney, Agent, or Firm*—W. James Brady, III; Richard L. Donaldson

[57] ABSTRACT

An integrated circuit card includes packaged semiconductor devices mounted on a substrate. The integrated circuit card also includes a housing bonded by sheet adhesives to the semiconductor devices or substrate. The housing includes top and bottom metal covers and may include spacers positioned between the sheet adhesives and semiconductor devices or substrate.

10 Claims, 14 Drawing Sheets

INTEGRATED CIRCUIT CARD

This application is a Continuation of application Ser. No. 07/801,971, filed Dec. 03, 1991, now abandoned.

CROSS-REFERENCE TO RELATED APPLICATIONS

The following coassigned patent applications are hereby incorporated herein by reference:

| Serial No. | Filing Date | TI Case No. |
| --- | --- | --- |
| 07/515,807 | 04/30/90 | 15197 |
| 07/707,353 | 03/29/91 | 16188 |
| 07/778,418 | 10/16/91 | 16114 |

FIELD OF THE INVENTION

This invention generally relates to the field of packaging plural semiconductor devices in a common container. More particularly, this invention relates to integrated circuit cards containing plural semiconductor devices, such as memory devices including DRAMs, SRAMs, ROMs, EPROMs, EERPOMs, and PROMs or other non-volatile memory, or other integrated circuit devices, in a container about the size of a credit card that is readily handled by a user and can be plugged into desired equipment.

BACKGROUND OF THE INVENTION

Credit card sized integrated circuit integrated circuit cards are commercially available and find utility in numerous electronic systems. In personal computers they supplement or replace floppy disks by carrying software programs and data. Integrated circuit cards are connected to the computer's internal logic by insertion through an opening in the side of the computer to mate with a socket contained within the computer. Portable personal computers, notebook computers, and pocket diaries particularly find integrated circuit cards convenient because they avoid the need for the expense, power requirements, bulk, and weight of a disk drive; the integrated circuit card needs only an electrical connector and minimal structural support.

Facsimile and copy machines can use an integrated circuit card to store data related to usage control. Typewriters and printers can use an integrated circuit card to store desired memory fonts. Word processors can use an integrated circuit card to store text. Hand-held terminals can use integrated circuit cards to store inventory control information. Electronic cash registers can use integrated circuit cards to store price information. Controllable machinery can use integrated circuit cards to store automation control information. Programmable controllers can use integrated circuit cards to store process control data. Electronic game systems can use integrated circuit cards to store the specifics of games to be enacted on TV screens by the players.

Other areas that can benefit from the use of integrated circuit cards include bulk data acquisition such as in music and photography, where the desired song or picture is stored in the memory devices of the card.

Presently available integrated circuit cards typically include one or more plastic-encapsulated or other types of integrated circuits solder attached to connection stripes or spots on a printed wire board. A connector is solder attached to metal lines which are formed on the printed wire board and extend to one edge of the board. The connector connects external power, signal, and ground lines to circuitry in the card. An external shell or encasement surrounds the printed wire board/integrated circuit/connector assembly. The encasement typically has top and bottom frames formed from molded plastic and bonded together along an outer edge to define an interior chamber in which the printed wire board is located. The top and bottom frames have ribs which contact and securely hold the printed wire board and connector in place. Top and bottom metal plates are bonded to the top and bottom frames, respectively, and cover openings in the top and bottom frames.

The use of a plastic frame adds significantly to the complexity, tooling costs, and tooling turn around time in integrated circuit card construction. This is due to the fact that the manufacture of a plastic frame requires the use of a mold. Whenever the size of the printed wire board or the number, location, or size of the semiconductor devices on the printed wire board is changed, a new plastic frame that will accommodate the changes is required. The fabrication of the mold for the new frame is extremely time consuming and expensive. As a result, the time and expense incurred in producing integrated circuit cards incorporating even minor design changes are significant.

The use of a molded plastic frame is also a major source of problems during assembly of the integrated circuit card due to the fact that molded plastic frames are easily bent and often have surface irregularities introduced during the molding process which prevent all integrated circuit card parts from fitting together properly. In addition, processes for bonding the top and bottom plastic frames together, such as ultrasonic welding, are difficult and produce integrated circuit cards having inconsistent quality.

Accordingly, a need exists for an integrated circuit integrated circuit card that can be produced quickly, is simple, inexpensive, and reliable, and does not require a plastic frame.

SUMMARY OF THE INVENTION

Generally, and in one form of the invention, an integrated circuit card includes a substrate having top and bottom surfaces with a plurality of first packaged semiconductor devices mounted on the top surface of the substrate and a plurality of second packaged semiconductor devices mounted on the bottom surface of the substrate. The integrated circuit card also includes a housing that is bonded to and covers the first and second packaged semiconductor devices.

In another form of the invention, an integrated circuit card includes a substrate having top and bottom surfaces with a plurality of packaged semiconductor devices mounted on one of the top and bottom surfaces of the substrate. The integrated circuit card also includes a housing having first and second portions, with the first portion bonded to and covering the packaged semiconductor devices and the second portion bonded to the other of the top and bottom surfaces.

BRIEF DESCRIPTION OF THE DRAWINGS

In the drawings:

FIG. 4b is an exploded view of the integrated circuit card according of FIG. 4a;

FIG. 5a shows a notched sheet of metal which may be folded to form a housing cover for the integrated circuit card of FIG. 4a;

FIG. 5b shows a sheet of metal which may be drawn to form a housing cover for the integrated circuit card of FIG, 4a;

FIG. 6 shows a press for bonding housing covers to the integrated circuit card of FIG, 4a;

FIG. 11 shows a sheet of metal which may folded to form the housing for the integrated circuit card of FIG, 10a;

FIG. 12b is an exploded view of the integrated circuit card according of FIG. 12a;

FIG. 13b is an exploded view of the integrated circuit card according of FIG. 13a;

Corresponding numerals and symbols in the different figures refer to corresponding parts unless otherwise indicated.

DETAILED DESCRIPTION OF PREFERRED EMBODIMENTS

Figure 1:
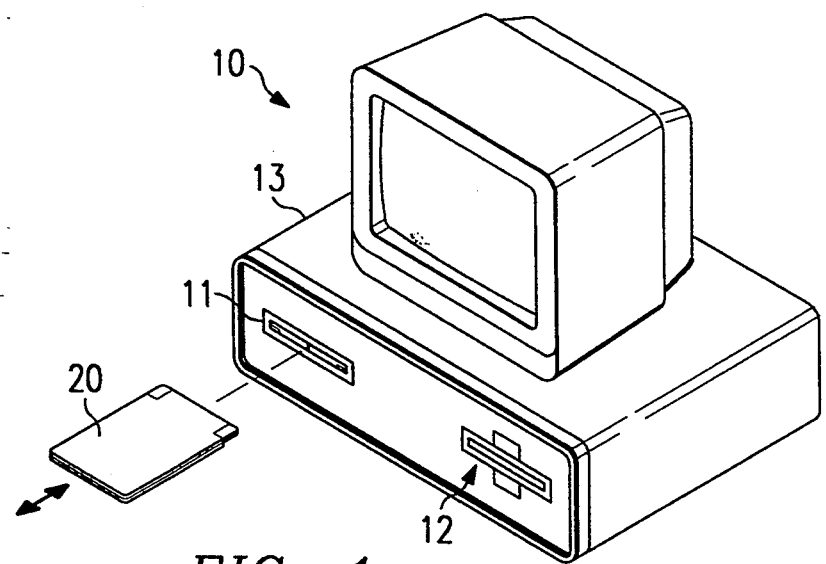
FIG. 1 is a perspective view of a personal computer using the integrated circuit card of the invention.

In FIG. 1, personal computer 10 includes an opening 11 for receiving an integrated circuit card 20 of the invention. An internal socket (not shown) within personal computer 10 adjacent opening 11 connects integrated circuit card 20 to address and data lines contained within personal computer 10. Integrated circuit card 20 can be used for any one of several purposes, including augmenting the semiconductor memory of the personal computer, presenting software or data to the personal computer or reconfiguring the personal computer 10 through information stored in solid state or semiconductor memory devices carried in integrated circuit card 20. Integrated circuit card 20 can be used in addition to or in place of floppy disk port 12, also located on the cabinet 13 of the personal computer.

Figure 2:
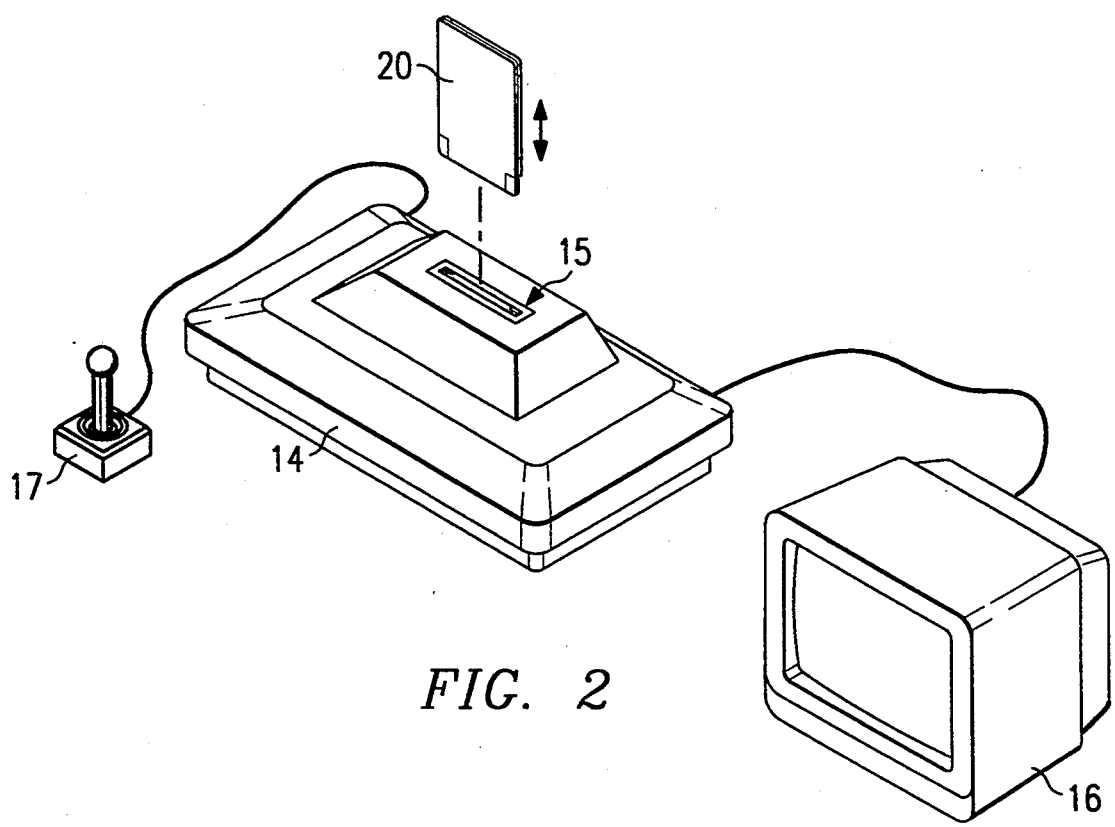
FIG. 2 is a perspective view of a game controller using the integrated circuit card of the invention.

In FIG. 2, a game controller 14 receives the integrated circuit card 20 through an opening 15. An internal socket (not shown) within game controller 14 adjacent opening 15 connects integrated circuit card 20 to address and data lines contained within game controller 14. In this instance, the integrated circuit card 20 carries software and data for the controller to execute a game displayed on TV 16 in response to the user effecting actions on the joystick 17.

Figure 3:
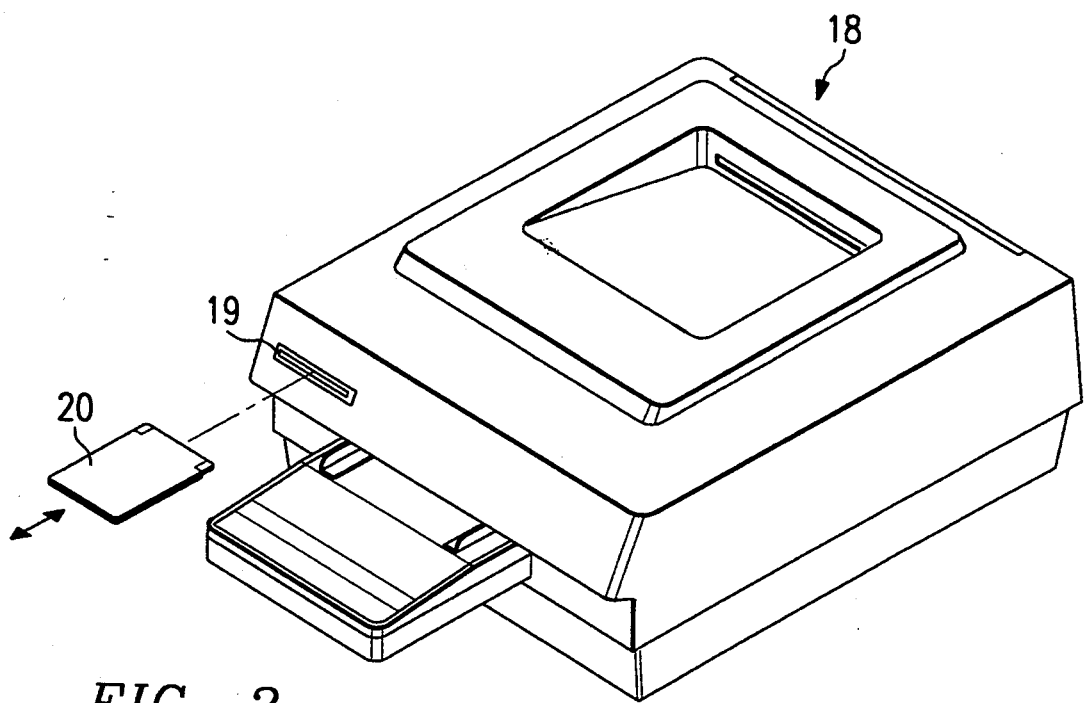
FIG. 3 is a perspective view of a laser printer using the integrated circuit card of the invention.

In FIG. 3, laser printer 18 receives integrated circuit card 20 at opening 19 for controlling the type fonts or other desired features of the laser printer. An internal socket (not shown) within laser printer 18 adjacent opening 19 connects integrated circuit card 20 to address and data lines contained within laser printer 18.

Figure 4A:
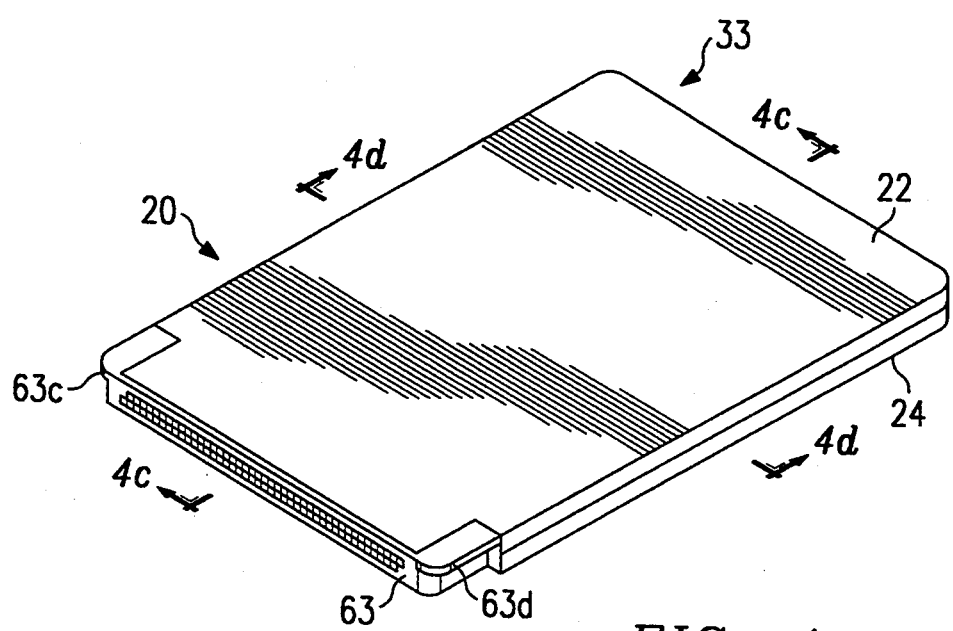
FIG. 4a is a perspective view of the top of an integrated circuit card according a first embodiment of the invention.
Figure 4B:
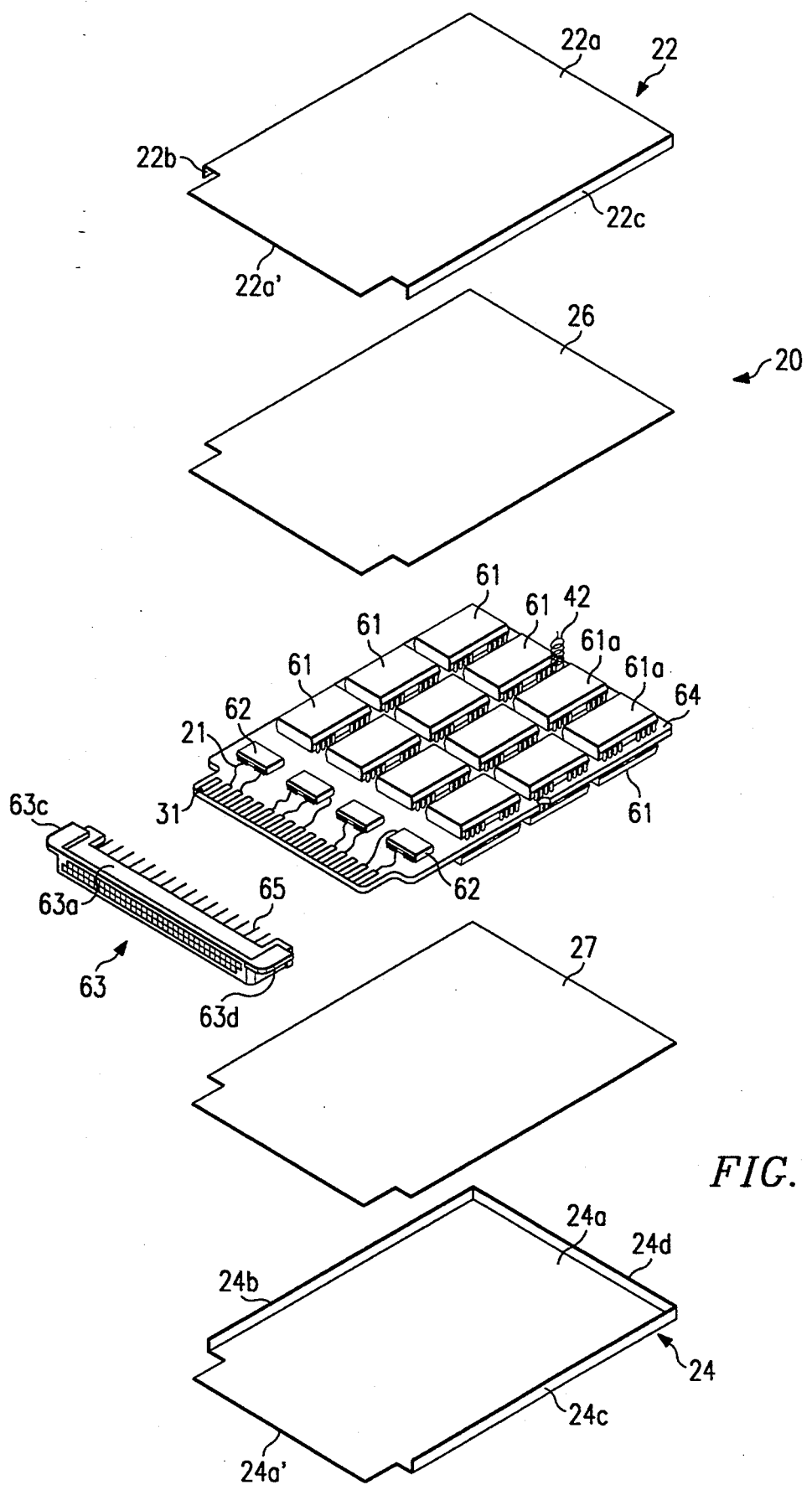
Figure 4C:
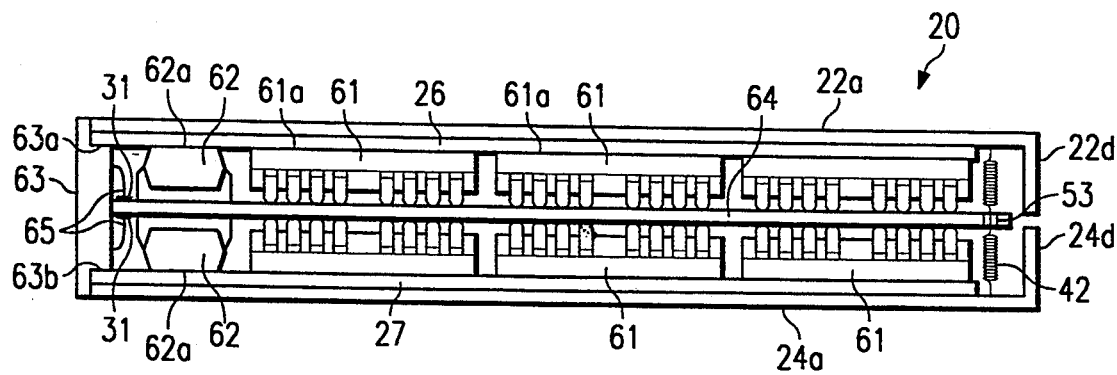
FIG. 4c is a cross-section of the integrated circuit card of FIG. 4a taken along section lines c—c.
Figure 4D:
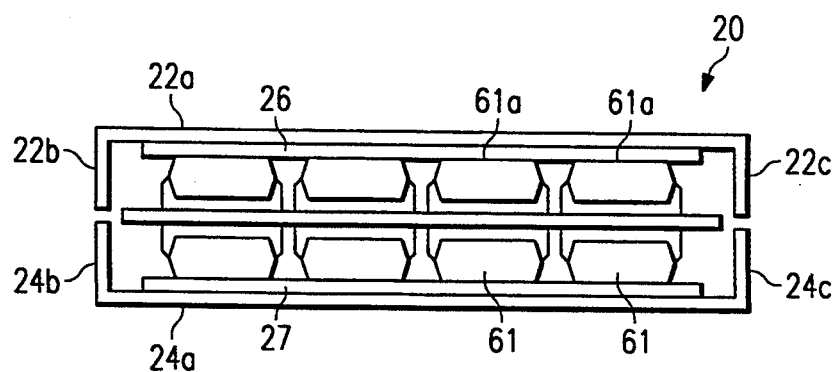
FIG. 4d is a cross-section of the integrated circuit card of FIG. 4a taken along section lines d—d.

FIGS. 4a and 4b show a perspective view and exploded perspective view, respectively, of an integrated circuit card 20 according to a first embodiment of the invention. FIGS. 4c and 4d show cross-sections of integrated circuit card 20 taken along section lines c—c and d—d of FIG. 4a. As seen in FIG. 4a, integrated circuit card 20 includes a housing 33 having a top portion comprising metal cover 22 and a bottom portion comprising metal cover 24. A connector 63 is located in an opening in one side of housing 33.

As seen in FIGS. 4b, 4c, and 4d, integrated circuit card 20 includes a substrate or printed wire board 64 having top and bottom surfaces on which printed circuit leads 21 are formed. Semiconductor devices 61 are mounted on the top and bottom surfaces of the printed wire board 64 and are connected to selected leads 21 to implement a desired integrated circuit device function. Semiconductor devices 61 may be memory devices, such as 1024K×4 DRAM memory devices manufactured by Texas Instruments, Inc. under part number TMS44400 DGA. Other semiconductor devices, such as devices 62 may also be provided to perform driving, decoding, or other selected logic functions. Other types of semiconductor devices, such as integrated circuit microprocessors or microcomputers, may be used in addition to or in place of memory devices to permit the integrated circuit card to perform other functions. Semiconductor devices 61 and 62 have upper surfaces 61a and 62a which are substantially parallel to the top and bottom surfaces of printed wire board 64.

Connector 63 includes tails 65 soldered to and in electrical contact with metal finger connectors 31. Finger connectors 31 are formed on printed wire board 64 adjacent its front edge and connected to selected leads 21. Connector 63 has a recessed area 63a on its top surface which mates with lip 22a' of cover 22 and a recessed area 63b (shown in cross-section in FIG. 4c) which mates with lip 24a' of cover 24. Recessed area 63b has the same length and width as recessed area 63a. Polarizing tabs 63c and 63d extend from the sides of connector 63 for mating with associated slots in a connector in a device in which integrated circuit card 20 is to be inserted to insure that integrated circuit card 20 is not inserted upside down.

A sheet adhesive 26 is sandwiched between surfaces 61a and 62a of those semiconductor devices 61 and 62 mounted on the top surface of printed wire board 64 and planar surface 22a of cover 22 and between recessed area 63a of connector 63 and lip 22a' of cover 22. Sheet adhesive 26 bonds cover 22 to surfaces 61a and 62a of those semiconductor devices 61 and 62 mounted on the top surface of printed wire board 64 and to recessed area 63a of connector 63. A sheet adhesive 27 is sandwiched between surfaces 61a and 62a of those semiconductor devices 61 and 62 mounted on the bottom surface of printed wire board 64 and planar surface 24a of cover 24 and between recessed area 63b of connector 63 and lip 24a' of cover 24. Sheet adhesive 27 bonds cover 24 to surfaces 61a and 62a of those semiconductor devices 61 and 62 mounted on the bottom surface of printed wire board 64 and to recessed area 63b of connector 63.

Cover 22 has sidewalls 22b and 22c and a rear wall 22d which extend from and are substantially perpendicular to planar surface 22a. Lip 22a' extends from and is coplanar to surface 22a. Cover 24 has sidewalls 24b and 24c and a rear wall 24d which extend from and are substantially perpendicular to planar surface 24a. Lip 24a' extends from and is coplanar to surface 24a. Walls 22b, 22c, and 22d are vertically aligned with walls 24b, 24c, and 24d, respectively. Although the edges of walls 22b, 22c, and 22d are shown in FIGS. 4a, 4c, 4d, and 4e as being slightly spaced apart in a vertical direction from the edges of walls 24b, 24c, and 24d, respectively, they may be in contact.

A conductive spring 42 extends through an opening 53 in printed wire board 64. Spring 42 contacts a lead 21 which serves as ground and top and bottom metal covers 22 and 24. Grounded metal covers 22 and 24 help protect semiconductor devices 61 and 62 from electrostatic discharge. In addition, metal covers 22 and 24 provide a protective outside shell, greatly increase the rigidity to the integrated circuit card since they are bonded to the semiconductor devices, act as heat sinks, and act as shields against electromagnetic and radio-frequency radiation. In contrast to integrated circuit cards using plastic frames, the fact that metal covers 22 and 24 do not contact printed wire board 64 or extend between the semiconductor devices also allows more space for the semiconductor devices and eliminates the necessity of retooling whenever the number or arrangement of semiconductor devices on the printed wire board is changed.

Figure 4E:
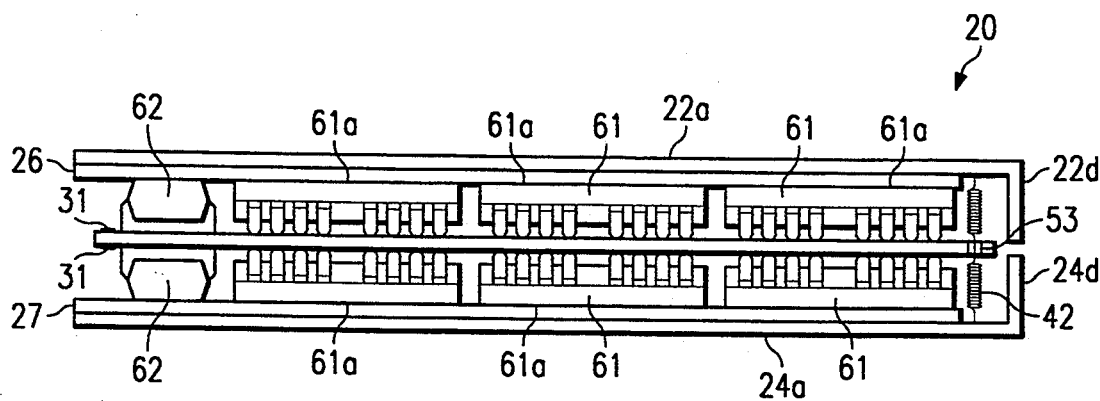
FIG. 4e is a cross-section of the integrated circuit card of FIG. 4a taken along section lines d—d in which the connector is omitted and the edge of the printed wire board and metal traces on the printed wire board act as an edge connector.

Connector 63 may be omitted from integrated circuit card 20 as shown in the cross-section of FIG. 4e. In this case, the edge of printed wire board 64 and finger connectors 31 on printed wire board 64 form an edge connector and mate directly with a corresponding female connector in the device in which card 20 is to be inserted. When connector 63 is omitted, sheet adhesives 26 and 27 need extend only over semiconductor devices 61 and 62. Covers 22 and 24 are bonded to and cover the surfaces 61a and 62a of semiconductor devices 61 and 62 and preferably extend completely over finger connectors 21 to protect them.

Figure 5A:
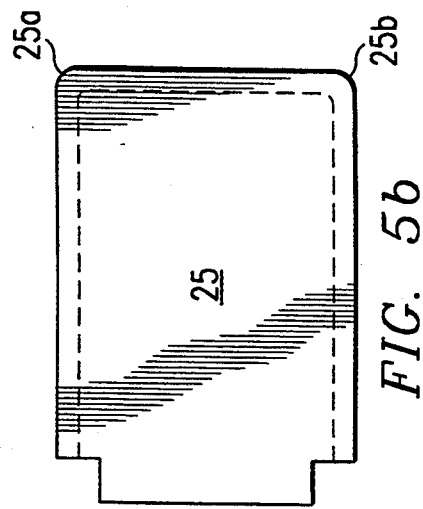
Figure 5B:
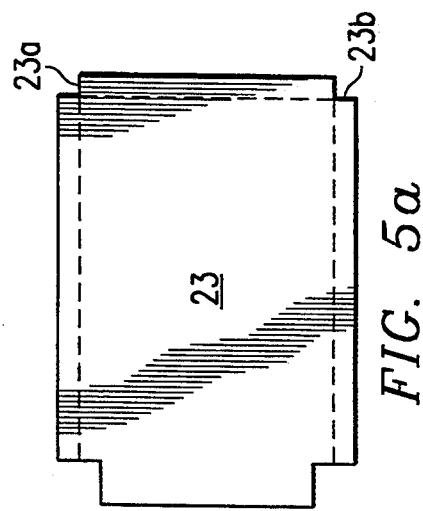

As shown in FIG. 5a, covers 22 and 24 may be formed from a flat sheet of metal 23 having notched edges 23a and 23b. The sidewalls and rear wall of covers 22 and 24 are formed by folding metal sheet 23 along the dashed lines. Alternatively, covers 22 and 24 may be drawn from a flat sheet of metal 25 having rounded corners 25a and 25b as shown in FIG. 5b. Metal sheet 25 is drawn along the dashed line to form the sidewalls and rear wall of covers 22 and 24. Sheets 23 and 25 may be aluminum with a thickness of about 10 mils or stainless steel with a thickness of about 5 mils, for example. Covers 22 and 24 may be identical to simplify manufacture of integrated circuit card 20.

Sheet adhesives 26 and 27 melt at a predetermined temperature to bond top cover 22 and bottom cover 24 to semiconductor devices 61 and 62 and to connector 63. Sheet adhesives 26 and 27 are selected to have a melting temperature greater than the recommended maximum operating temperature of the integrated circuit card 20 but less than the melting temperature of solder used to attach devices 61 and 62 to substrate 64. This insures that covers 22 and 24 remain securely bonded during normal integrated circuit card operation and that devices 61 and 62 are not disconnected from leads 21 during bonding of covers 22 and 24. A melting temperature in the range of 125–130 degrees Centigrade is suitable for most applications. A suitable sheet adhesive is the polyester thermoplastic adhesive film/tape P-220 made by Electro-Seal Corporation.

Figure 6:
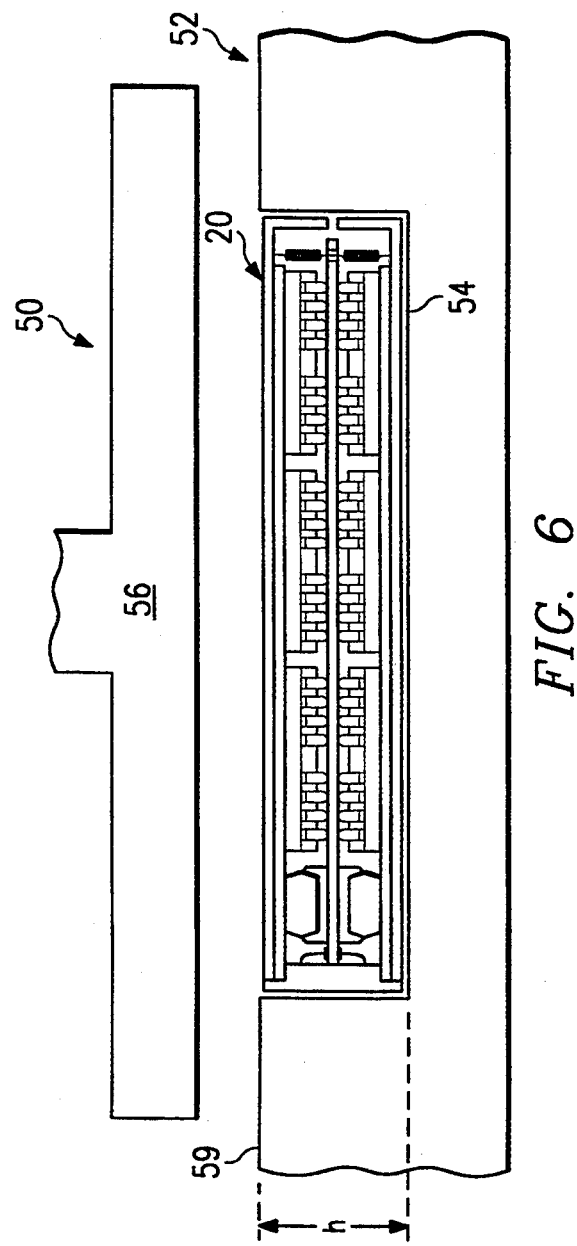

Sheet adhesives 26 and 27 are melted by placing the components of card 20 in a heated press 50 as shown in FIG. 6. Heated press 50 includes a support 52 having a recessed area 54 in which integrated circuit card 20 is placed and a compressing surface 56 which moves in a vertical direction. Recessed area 54 and compressing surface 56 may be heated by internal electric coils or passages through which hot oil flows, for example. Top surface 59 of support 52 limits the downward vertical movement of surface 56 to a distance h above the bottom of recessed area 54. The distance h is equal to the desired thickness of integrated circuit card 20.

Prior to the bonding of covers 22 and 24, the combined thickness of the integrated circuit card components is slightly greater than the desired thickness h. For example, if the desired thickness h is 130 mils, the combined thickness of the components may be approximately 140 mils, with printed wire board 64 and mounted semiconductor devices 61 and 62 having a combined thickness of approximately 100 mils, covers 22 and 24 each having a thickness of 5 mils, and adhesive sheets 26 and 27 each having a thickness of 15 mils. Adhesive sheets 26 and 27, which are the only components in integrated circuit card 20 whose thickness can be changed, must therefore be squeezed from a combined thickness of 30 mils between the semiconductor devices and covers 22 and 24 to a combined thickness of 20 mils to achieve the desired integrated circuit card thickness of 130 mils.

Covers 22 and 24 are bonded to surfaces 61a and 62a of semiconductor devices 61 and 62 and to connector 63 by bringing compressing surface 56 into contact with cover 22 and heating recessed area 54 and surface 56. Covers 22 and 24 conduct heat from recessed area 54 and compressing surface 56 of press 50 to sheet adhesives 26 and 27 causing them to melt. Compressing surface 56 is moved downward in a vertical direction applying pressure to covers 22 and 24 to squeeze sheet adhesives 26 and 27 forcing melted adhesive from between the semiconductor devices and covers 22 and 24 into empty spaces adjacent the semiconductor devices. This reduces the thickness of sheet adhesives 26 and 27 between the semiconductor devices and covers 22 and 24 and therefore the thickness of the card 20. Compressing surface 56 moves downward until it contacts surface 59 at which point the predetermined card thickness h is reached. Recessed area 54 and compressing surface 56 are then allowed to cool to permit the melted adhesive to harden and bond covers 22 and 24 to semiconductor devices 61 and 62.

The fact that different portions of sheet adhesives 26 and 27 can be squeezed to different thicknesses also compensates for slight variations in height between surfaces 61a and 62a of individual semiconductor devices 61 and 62 above printed wire board 64 resulting from packaging or mounting differences. Where such slight variations in height are present, press 50 will squeeze different portions of sheets 26 and 27 to different thicknesses to produce an integrated circuit card 20 having a uniform desired thickness.

While it is preferred that top and bottom metal covers 22 and 24 have sidewalls 22b, 22c, 24b, and 24c and rear walls 22d and 24d as shown in FIGS. 4a–4e in order to provide added protection for semiconductor devices 61 and 62, increase the rigidity of the integrated circuit card, and enhance integrated circuit card appearance, the sidewalls and rear walls may be omitted if desired.

Figure 7A:
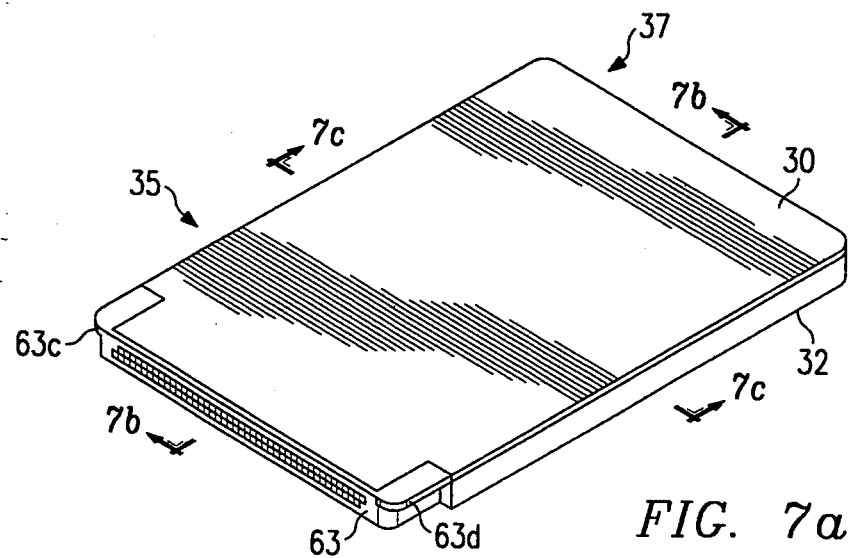
FIG. 7a is a perspective view of the top of an integrated circuit card according a second embodiment of the invention.
Figure 7B:
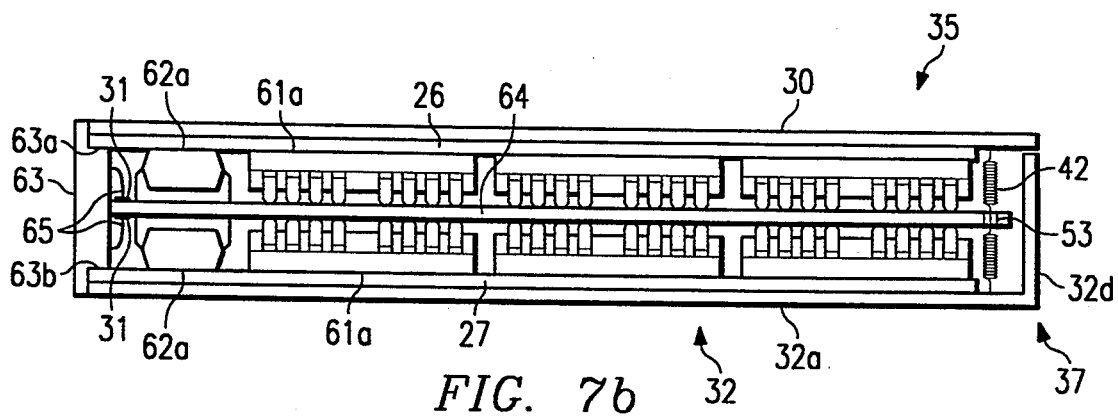
FIG. 7b is a cross-section of the integrated circuit card of FIG. 7a taken along section lines b—b; FIG, 7c is a cross-section of the integrated circuit card of FIG. 7a taken along section lines c—c.
Figure 7C:
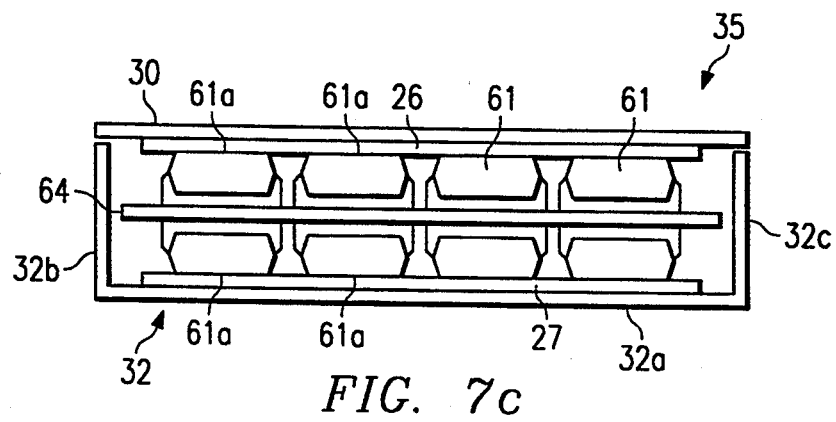

FIG. 7a–7c show an integrated circuit card 35 according to a second embodiment of the invention. Integrated circuit card 35 includes a housing 37 having a top portion comprising metal cover 30 and a bottom portion comprising metal cover 32. Top cover 30 has a planar surface 30a from which coplanar lip 30a' extends and does not have sidewalls or a rear wall. Bottom cover 32 has side walls 32b and 32c and rear wall 32d which extend in a direction perpendicular to planar surface 32a. Lip 32a' extends from and is coplanar to surface 32a. The side and rear edges of cover 30 are adjacent to the edges of sidewalls 32b and 32c and rear wall 32d when integrated circuit card 35 is assembled to substantially enclose the sides and rear of the integrated circuit card. Top and bottom covers 30 and 32 are bonded to surfaces 61a and 62a of semiconductor devices 61 and 62 and to recessed areas of 63a and 63b of connector 63 by sheet adhesives 26 and 27 as described above.

Figure 8A:
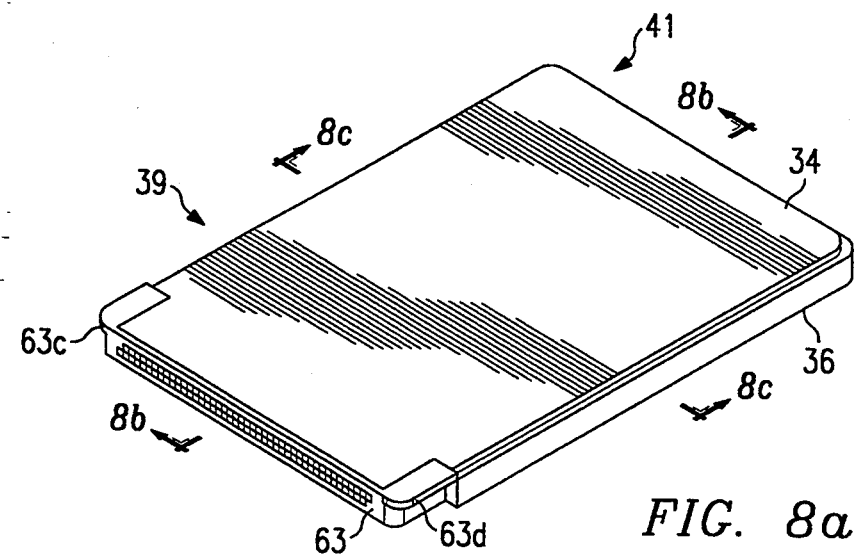
FIG. 8a is a perspective view of the top of an integrated circuit card according a third embodiment of the invention.
Figure 8B:
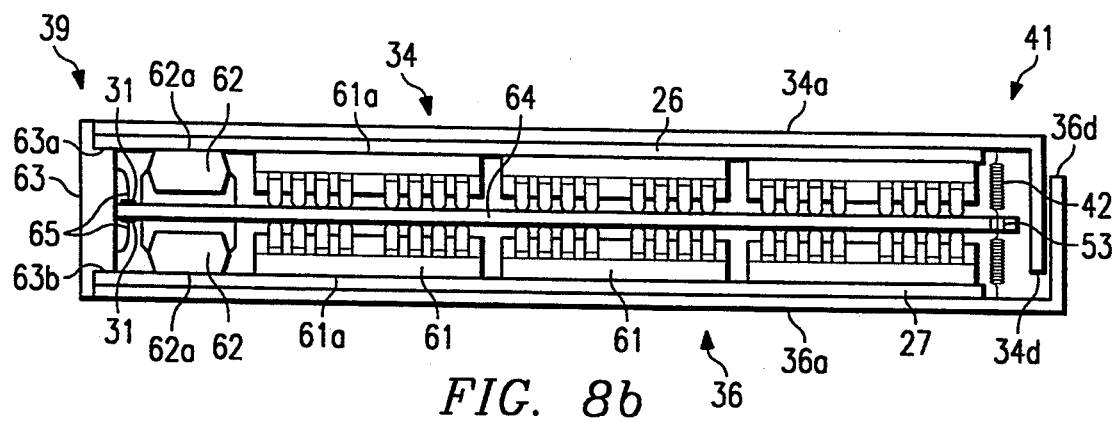
FIG. 8b is a cross-section of the integrated circuit card of FIG. 8a taken along section lines b—b.
Figure 8C:
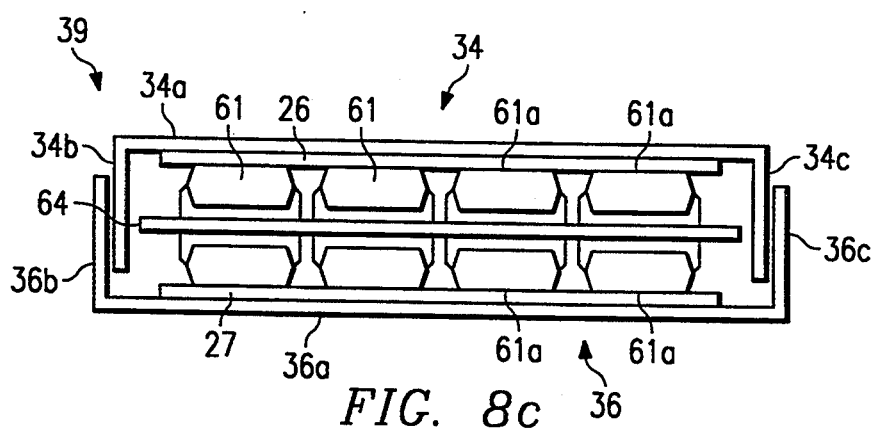
FIG. 8c is a cross-section of the integrated circuit card of FIG. 8a taken along section lines c—c.

FIGS. 8a–8c show an integrated circuit card 39 according to a third embodiment of the invention. Integrated circuit card 39 includes a housing 41 having a top portion comprising metal cover 34 and a bottom portion comprising metal cover 36 with covers 34 and 36 having overlapping side and rear walls. Top cover 34 has sidewalls 34b and 34c and rear wall 34d which extend in a direction perpendicular to planar surface 34a. Lip 34a' extends from and is coplanar to surface 34a. Bottom cover 36 has sidewalls 36b and 36c and rear wall 36d which extend in a direction perpendicular to planar surface 36a. Lip 36a' extends from and is coplanar to surface 36a. Top and bottom covers 34 and 36 are bonded to surfaces 61a and 62a of semiconductor devices 61 and 62 and to recessed areas 63a and 63b of connector 63 by sheet adhesives 26 and 27 as described above. When integrated circuit card 39 is assembled, the outer surfaces of sidewalls 34b and 34c and rear wall 34d are located adjacent the inner surfaces of sidewalls 36b and 36c and rear wall 36d, respectively. The overlapping sidewalls and rear walls completely enclose the sides and rear of integrated circuit card 39 to provide added protection to printed wire board 64 and semiconductor devices 61 and 62.

Figure 9A:
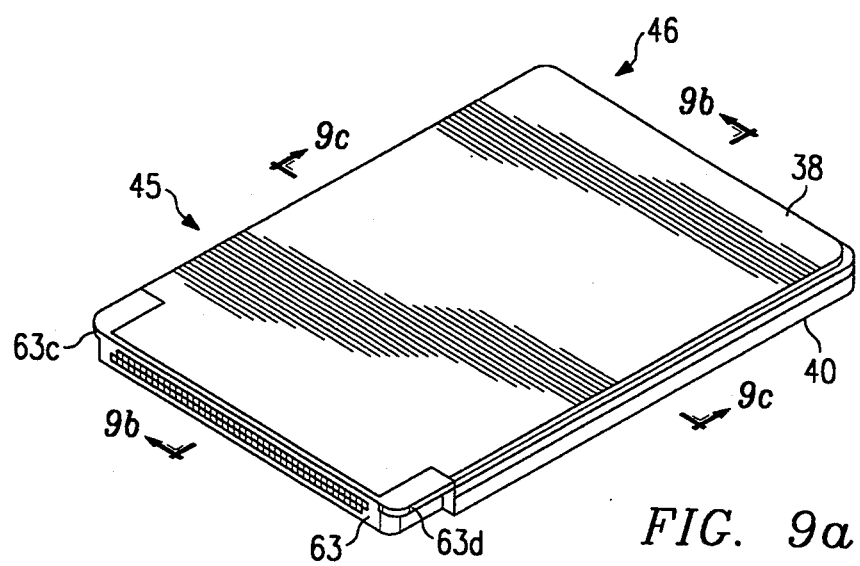
FIG. 9a is a perspective view of the top of an integrated circuit card according a fourth embodiment of the invention.
Figure 9B:
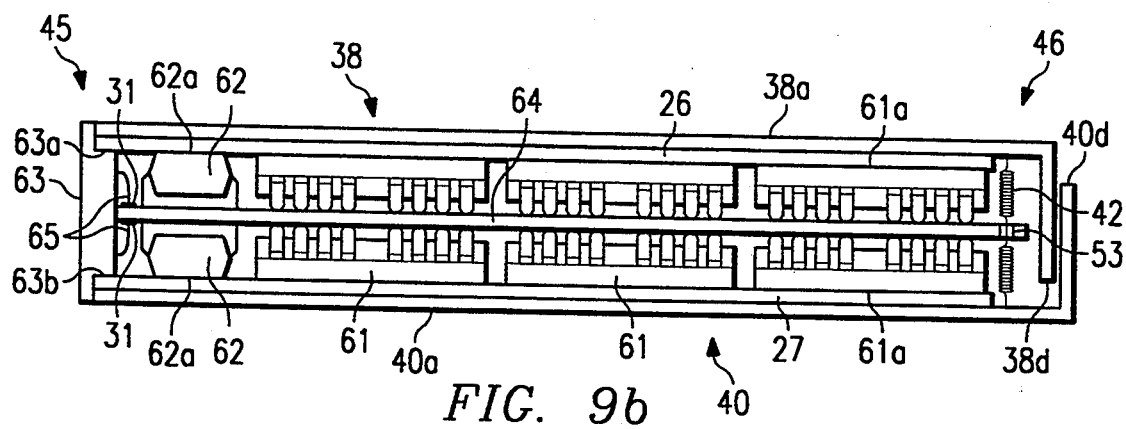
FIG. 9b is a cross-section of the integrated circuit card of FIG. 9a taken along section lines b—b.
Figure 9C:
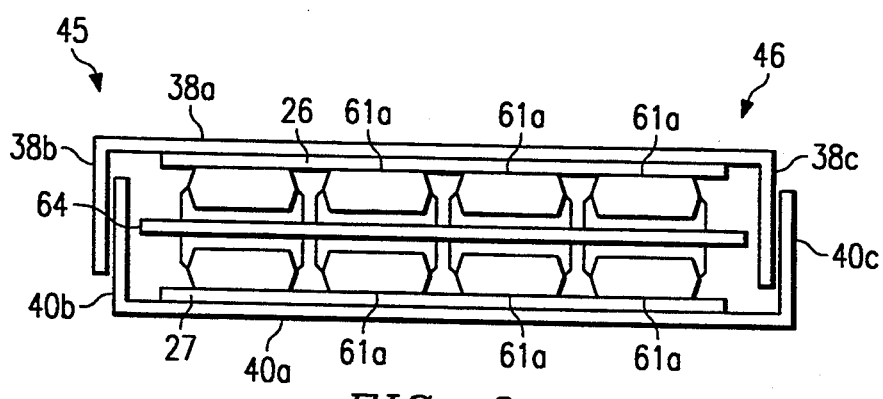
FIG. 9c is a cross-section of the integrated circuit card of FIG. 9a taken along section lines c—c.

FIGS. 9a–9c show an integrated circuit card 45 according to a fourth embodiment of the invention. Integrated circuit card 45 includes a housing 46 having a top portion comprising metal cover 38 and a bottom portion comprising metal cover 40 with covers 38 and 40 having overlapping side and rear walls. Top cover 38 has sidewalls 38b and 38c and rear wall 38d which extend in a direction perpendicular to planar surface 38a. Lip 38a' extends from and is coplanar to surface 38a. Bottom cover 40 has sidewalls 40b and 40c and rear wall 40d which extend in a direction perpendicular to planar surface 40a. Lip 40a' extends from and is coplanar to surface 40a. Top and bottom covers 38 and 40 are bonded to surfaces 61a and 62a of semiconductor devices 61 and 62 and to recessed areas 63a and 63b of connector 63 by sheet adhesives 26 and 27 as described above. When integrated circuit card 45 is assembled, the outer surfaces of sidewall 38c and rear wall 38d are located adjacent the inner surfaces of sidewall 40c and rear wall 40d, respectively. The inner surface of sidewall 38b is located adjacent outer surface of sidewall 40b. The arrangement of overlapping side and rear walls in integrated circuit card 45 requires an opening or slit between rear wall 38d and sidewalls 38b and 38c and an opening or slit between rear wall 40d and sidewalls 40b and 40c. The required opening or slit is inherently present when covers 38 and 40 are formed from a metal sheet 23 as shown in FIG. 5a. When covers 38 and 40 are formed from a metal sheet 25 as shown in FIG. 5b, openings must be cut at the intersections between the rear wall and sidewalls.

Figure 10A:
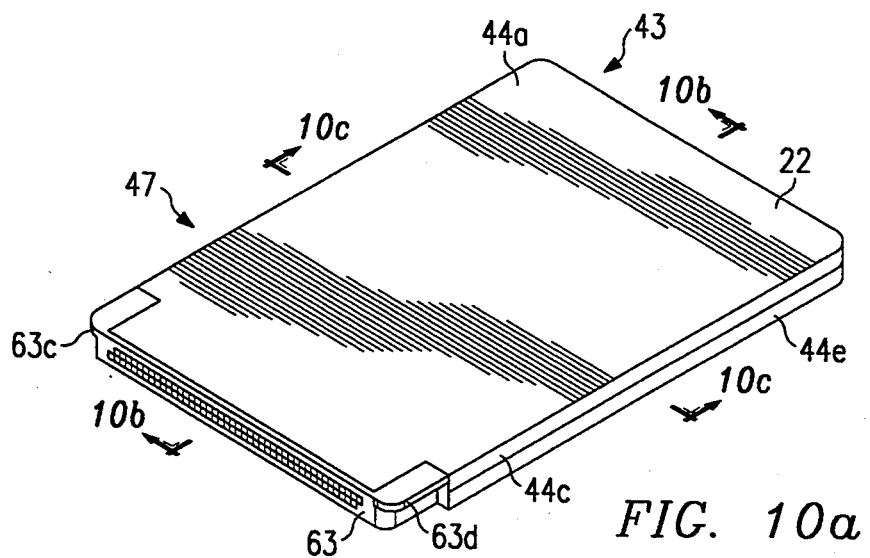
FIG. 10a is a perspective view of the top of an integrated circuit card according a fifth embodiment of the invention.
Figure 10B:
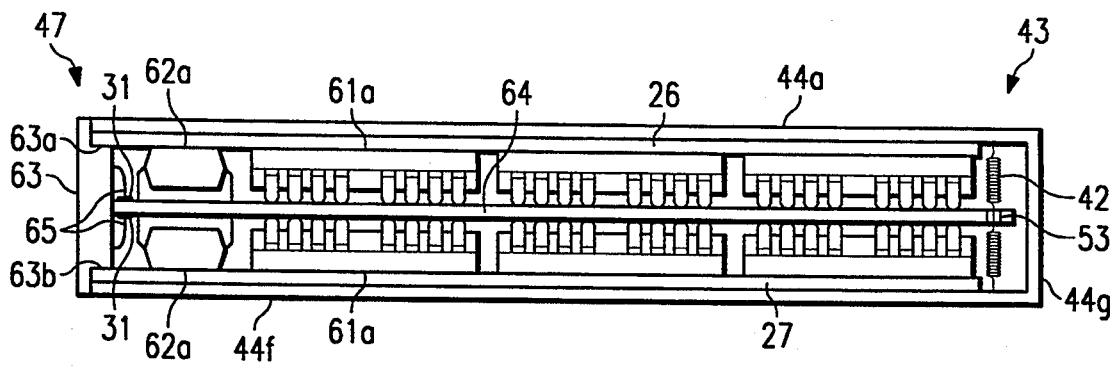
FIG. 10b is a cross-section of the integrated circuit card of FIG, 10a taken along section lines b—b.
Figure 10C:
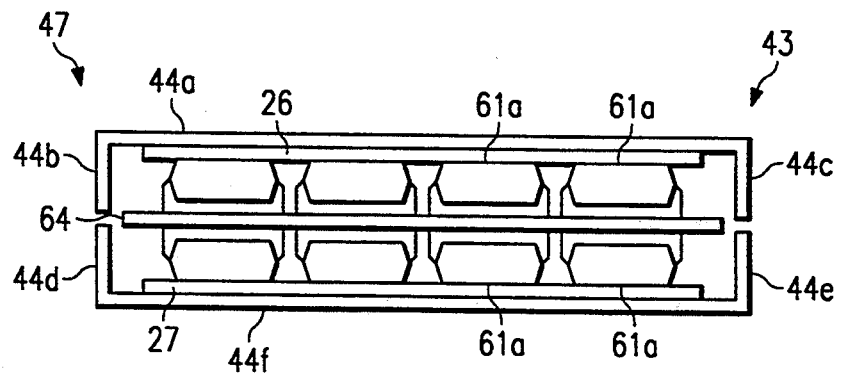
FIG. 10c is a cross-section of the integrated circuit card of FIG, 10a taken along section lines c—c.
Figure 11:
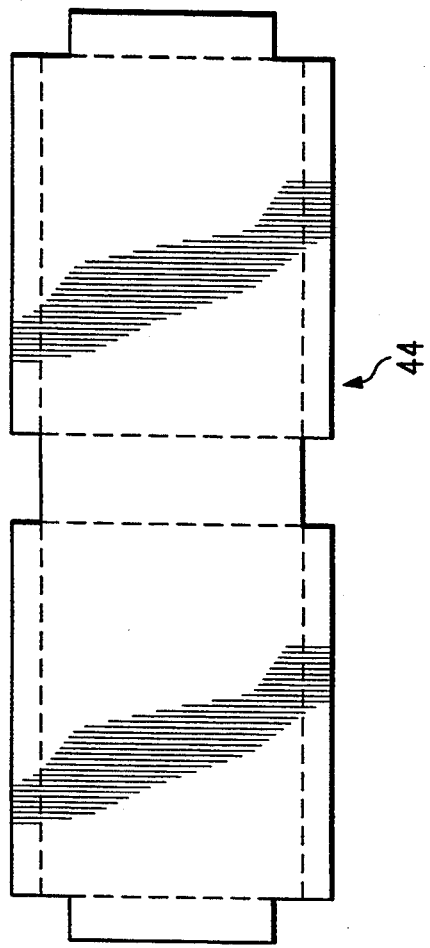
Figure 12A:
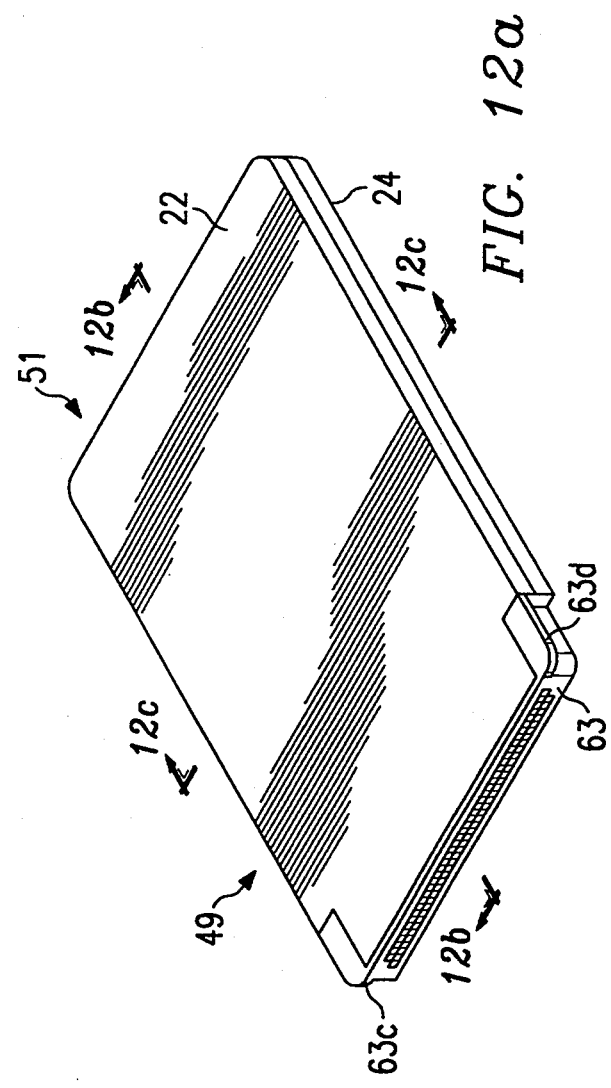
FIG. 12a is a perspective view of the top of an integrated circuit card according a sixth embodiment of the invention.
Figure 12B:
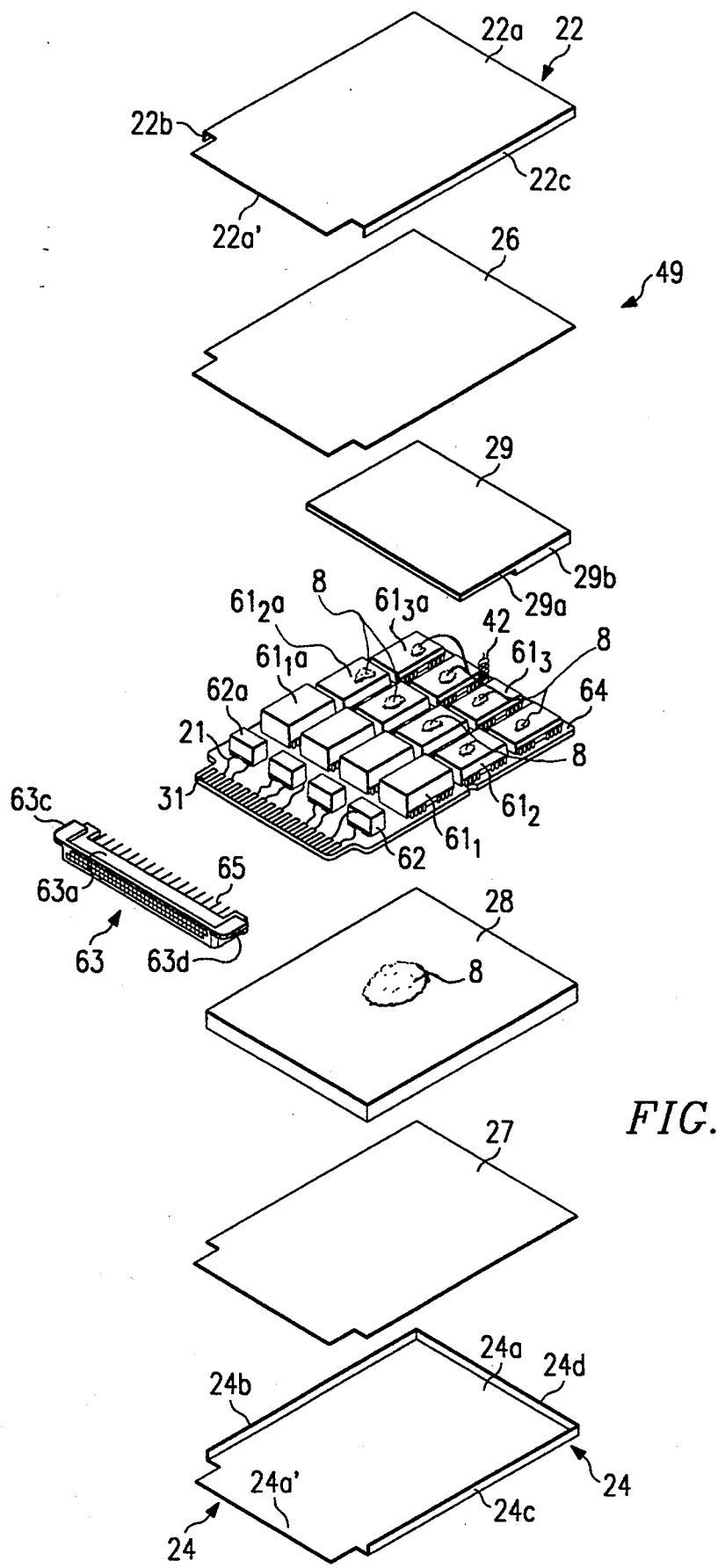
Figure 12C:
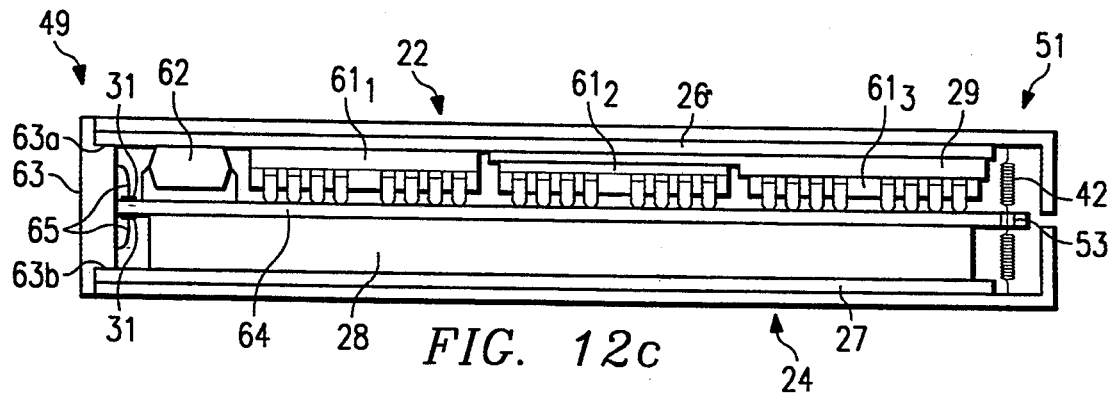
FIG. 12c is a cross-section of the integrated circuit card of FIG. 12a taken along section lines c—c.
Figure 12D:
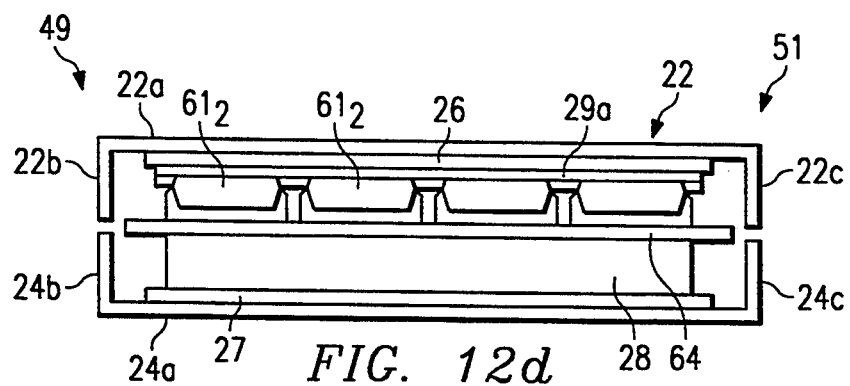
FIG. 12d is a cross-section of the integrated circuit card of FIG. 12a taken along section lines d—d.
Figure 13A:
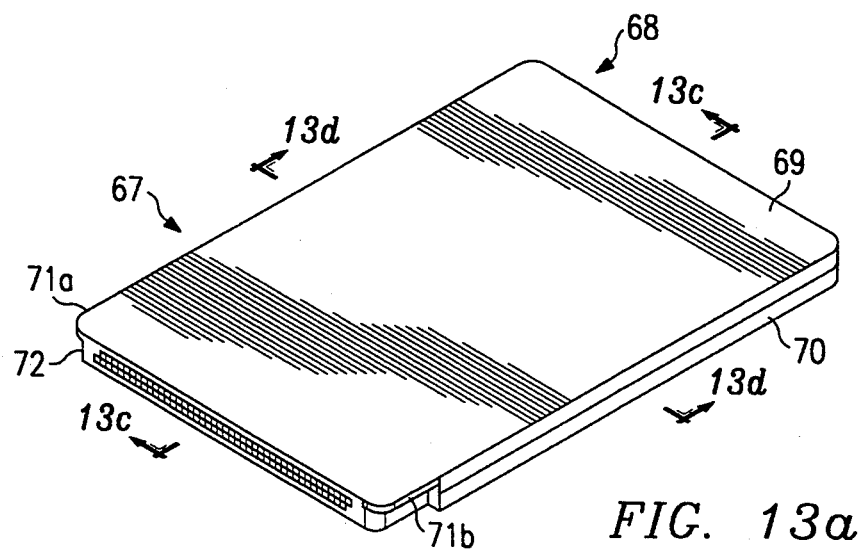
FIG. 13a is a perspective view of the top of an integrated circuit card according a sixth embodiment of the invention.
Figure 13B:
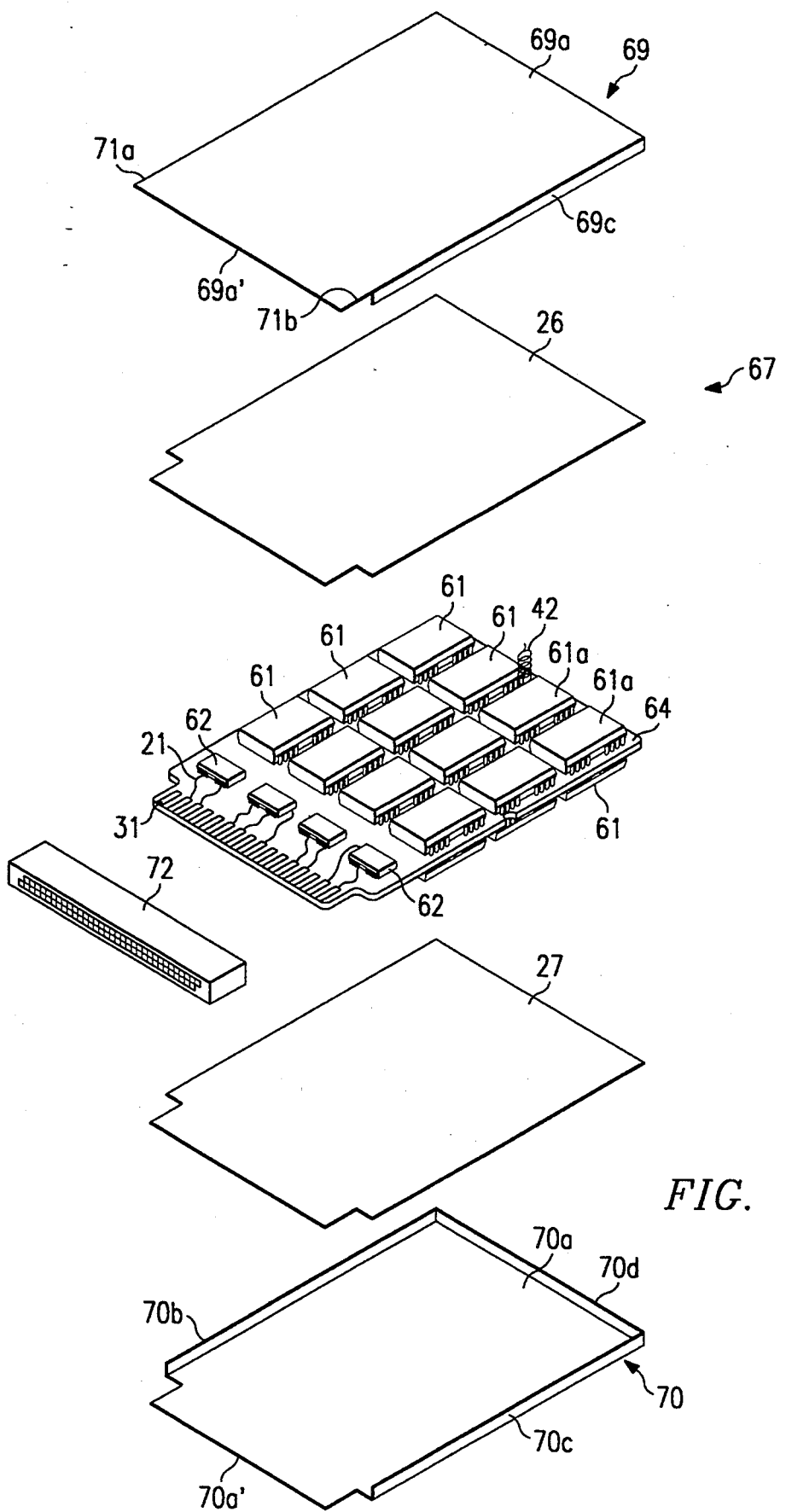
Figure 13C:
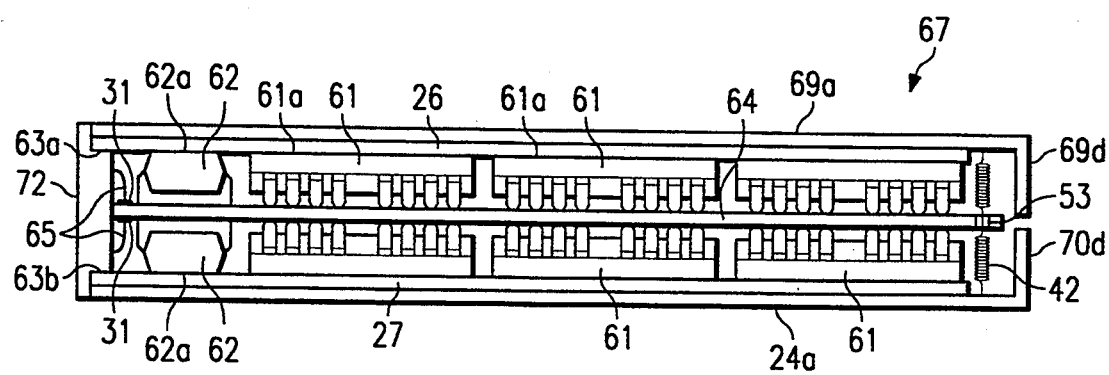
FIG. 13c is a cross-section of the integrated circuit card of FIG. 13a taken along section lines c—c.
Figure 13D:
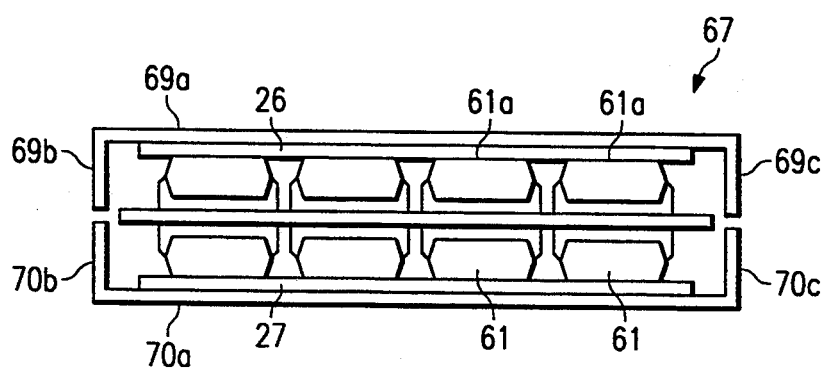
FIG. 13d is a cross-section of the integrated circuit card of FIG. 13a taken along section lines d—d.

FIGS. 10a–10c show an integrated circuit card 47 according to a fifth embodiment of the invention. Integrated circuit card 47 includes a housing 43 which is formed from a single sheet 44 of metal folded along the dashed lines shown in FIG. 11. Housing 43 includes a top portion comprising planar surface 44a and sidewalls 44b and 44c and a bottom portion comprising planar surface 44f and sidewalls 44d and 44e. Lip 44a' extends from and is coplanar to surface 44a. Lip 44f' extends from and is coplanar to surface 44f. A rear wall 44g connects planar surfaces 44a and 44f. Sidewalls 44b, 44c, 44d, and 44e and rear wall 44g are substantially perpendicular to planar surfaces 44a and 44f. Top and bottom surfaces 44a and 44f are bonded to surfaces 61a and 62a of semiconductor devices 61 and 62 and lips 44a' and 44f' bonded to recessed areas 63a and 63b of connector 63 by sheet adhesives 26 and 27 as described above.

FIGS. 12a–12d show an integrated circuit card 49 according to a sixth embodiment of the invention in which spacers are used to produce an integrated circuit card having a desired thickness with parallel top and bottom surfaces. Integrated circuit card 49 includes a housing 51 having a top portion comprising metal cover 22 and spacer 29 and a bottom portion comprising metal cover 24 and spacer 28. In this embodiment, semiconductor devices 62, 61$_1$, 61$_2$, and 61$_3$ are mounted only on the top surface of substrate 64. Top surfaces 62$a$ and 61$_1a$ of devices 62 and 61$_1$ are located a first distance from the top surface of printed wire board 64. Top surfaces 61$_2a$ of devices 61$_2$ are located a second distance, which is less than the first distance, from the top surface of printed wire board 64. Top surfaces 61$_3a$ of devices 61$_3$ are located a third distance, which is less than the second distance, from the top surface of printed wire board 64. A rectangular spacer 28 is bonded to the bottom surface of substrate 64 and a spacer 29 having portions 29$a$ and 29$b$ of different thicknesses is bonded to surfaces 61$_2a$ and 61$_3a$ of semiconductor devices 61$_2$ and 61$_3$, respectively. While spacers 28 and 29 are shown bonded to substrate 64 and surfaces 61$_2a$ and 61$_3a$ using a liquid glue, other adhesives such as sheet adhesives could also be used.

Sheet adhesive 26 is sandwiched between spacer 29 and surface 22$a$ of cover 22, between surfaces 62$a$ and 61$_1a$ of devices 62 and 61$_1$ and surface 22$a$, and between recessed area 63$a$ of connector 63 and lip 22$a'$ of cover 22. When heated in press 50 as described above, sheet adhesive 26 bonds cover 22 to spacer 29, surfaces 62 and 61$_1a$, and connector 63. Sheet adhesive 27 is sandwiched between spacer 28 and surface 24$a$ of cover 24 and between recessed area 63$b$ of connector 63 and lip 24$a'$ of cover 24. When heated in press 50 as described above, sheet adhesive 27 bonds cover 24 to spacer 28 and connector 63.

Spacer 28 has a thickness such that cover 24, when bonded to connector 63 and spacer 28, is substantially parallel to substrate 64. Portions 29$a$ and 29$b$ of spacer 29 have thicknesses such that cover 24, when bonded to connector 63, surfaces 62 and 61$_1a$, and spacer 29, is substantially parallel to substrate 64. Spacers 28 and 29 have widths and lengths sufficient to adequately support housing portion 24 to prevent plate 24 from being inadvertently bent. Spacers 28 and 29 may be machined from solid metal or plastic. The simple shapes of the spacers 28 and 29 are quickly and inexpensively machined and do not require a mold for fabrication.

FIGS. 13$a$–13$d$ show an integrated circuit card 67 according to a seventh embodiment of the invention. Integrated circuit card 67 includes a housing 68 having a top portion comprising metal cover 69 and a bottom portion comprising metal cover 70. Top cover 69 has sidewalls 69$b$ and 69$c$ and rear wall 69$d$ which extend in a direction perpendicular to planar surface 69$a$. Lip 69$a'$ extends from and is coplanar to surface 69$a$. Bottom cover 70 has sidewalls 70$b$ and 70$c$ and rear wall 70$d$ which extend in a direction perpendicular to planar surface 70$a$. Lip 70$a'$ extends from and is coplanar to surface 70$a$. Top and bottom covers 69 and 70 are bonded to surfaces 61$a$ and 62$a$ of semiconductor devices 61 and 62 and to connector 72 by sheet adhesives 26 and 27 as described above. Edges 71$a$ and 71$b$ of lip 69$a'$ extend past the side edges of connector 72 and act as polarizing tabs for mating with associated slots in a connector in a device in which integrated circuit card 67 is to be inserted to insure that integrated circuit card 67 is not inserted upside down.

A few preferred embodiments have been described in detail hereinabove. It is to be understood that the scope of the invention also comprehends embodiments different from those described, yet within the scope of the claims.

For example, spacers having more than two portions of differing thicknesses may be used; two or more spacers may be stacked on one another to produce an integrated circuit card having a desired thickness; two or more adjacent spacers of different thicknesses may be used in place of a single spacer having portions of differing thicknesses; different numbers or arrangements of semiconductor devices may be used; thermo-set or thermo-melt sheet adhesives may be used; other forms of sheet adhesive, such as double-sided tape, may be used; liquid or paste adhesives may also be used in place of sheet adhesives; the integrated circuit card may have a non-uniform thickness.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated circuit card, comprising: a substrate having top and bottom surfaces;
    a plurality of first packaged semiconductor devices mounted on said top surface of said substrate;
    a plurality of second packaged semiconductor devices mounted on said bottom surface of said substrate;
    a housing bonded to and covering said first and second packaged semiconductor devices, said housing including a first metal cover having a planar surface bonded to at least selected ones of said first packaged semiconductor devices, a second metal cover having a planar surface bonded to at least selected ones of said second packaged semiconductor devices, metal sidewalls extending between said first and second metal covers, and a metal rear wall extending between said first and second metal covers, said first and second metal covers, metal sidewalls, and metal rear wall forming external surfaces of said integrated circuit card, said metal sidewalls including a first portion extending from said planar surface of said first metal cover and a second portion extending from said planar surface of said second metal cover and said metal rear wall including a first portion extending from said planar surface of said first metal cover and a second portion extending from said planar surface of said second metal cover; and
    a connector attached to said substrate, said first metal cover having a lip that extends from and is substantially planar to said planar surface of said first metal cover bonded to a top surface of said connector, said second metal cover having a lip that extends from and is substantially planar to said planar surface of said second metal cover bonded to a bottom surface of said connector.

2. The integrated circuit card of claim 1 in which said first metal cover is bonded to said first packaged semiconductor devices by a first sheet adhesive and said second metal cover is bonded to said second packaged semiconductor devices by a second sheet adhesive.

3. The integrated circuit card of claim 1, in which said housing includes a spacer bonded to nonselected ones of said packaged semiconductor devices and to one of said first and second metal covers.

4. The integrated circuit card of claim 1, in which said first and second metal covers are connected to a ground lead on said substrate.

5. The integrated circuit card of claim 1 in which said first metal cover, second metal cover, metal sidewalls, and metal rear wall are integrally formed.

6. An integrated circuit card, comprising:

a substrate having top and bottom surfaces;

a plurality of packaged semiconductor devices mounted on one of said top and bottom surfaces of said substrate;

a housing having first and second portions, said first portion bonded to and covering said packaged semiconductor devices, said second portion bonded to the other of said top and bottom surfaces, said first portion including a first metal cover having a planar surface bonded to at least selected ones of said packaged semiconductor devices, said second portion including a spacer bonded to the other of said top and said bottom surfaces of said substrate and a second metal cover having a planar surface bonded to said spacer, said housing further including metal sidewalls extending between said first and second metal covers and a metal rear wall extending between said first and second metal covers, said first and second metal covers, metal sidewalls, and metal rear wall forming external surfaces of said integrated circuit card, said metal sidewalls including a first portion extending from said planar surface of said first metal cover and a second portion extending from said planar surface of said second metal cover and said metal rear wall including a first portion extending from said planar surface of said first metal cover and a second portion extending from said planar surface of said second metal cover; and a connector attached to said substrate, said first metal cover having a lip that extends from and is substantially planar to said planar surface of said first metal cover bonded to a top surface of said connector, said second metal cover having a lip that extends from and is substantially planar to said planar surface of said second metal cover bonded to a bottom surface of said connector.

7. The integrated circuit card of claim 6 in which said first metal cover is bonded to said packaged semiconductor devices by a first sheet adhesive and said second metal cover is bonded to said spacer by a second sheet adhesive.

8. The integrated circuit card of claim 6, in which said housing includes a spacer bonded to nonselected ones of said packaged semiconductor devices and to said first metal cover.

9. The integrated circuit card of claim 6, in which said first and second metal covers are connected to a ground lead on said substrate.

10. The integrated circuit card of claim 6 in which said first metal cover, second metal cover, metal sidewalls, and metal rear wall are integrally formed.

* * * * *